US012133053B2

(12) United States Patent
Petersen et al.

(10) Patent No.: US 12,133,053 B2
(45) Date of Patent: Oct. 29, 2024

(54) HEARING AID WITH SPEAKER UNIT AND DOME

(71) Applicant: Oticon A/S, Smørum (DK)

(72) Inventors: Svend Oscar Petersen, Smørum (DK); Jens Mørup, Smørum (DK); Nicolai Terp Holm, Smørum (DK); Sune Heibing, Smørum (DK); Anders Thule, Smørum (DK)

(73) Assignee: Oticon A/S, Smørum (DK)

( * ) Notice: Subject to any disclaimer, the term of this patent is extended or adjusted under 35 U.S.C. 154(b) by 153 days.

(21) Appl. No.: 17/886,602

(22) Filed: Aug. 12, 2022

(65) Prior Publication Data

US 2023/0050184 A1 Feb. 16, 2023

(30) Foreign Application Priority Data

Aug. 13, 2021 (EP) .................................... 21191182

(51) Int. Cl.
*H04R 25/00* (2006.01)

(52) U.S. Cl.
CPC ......... *H04R 25/604* (2013.01); *H04R 25/654* (2013.01); *H04R 25/656* (2013.01); *H04R 2225/025* (2013.01)

(58) Field of Classification Search
CPC .. H04R 25/604; H04R 25/654; H04R 25/656; H04R 2225/025
See application file for complete search history.

(56) References Cited

U.S. PATENT DOCUMENTS

2013/0148830 A1 6/2013 Sakaguchi et al.
2016/0269839 A1* 9/2016 Meyer .................. H04R 25/654
2017/0070832 A1 3/2017 Møller et al.
(Continued)

OTHER PUBLICATIONS

Extended European Search Report for European Application No. 22188764.9, dated Jan. 25, 2023.

*Primary Examiner* — Sunita Joshi
(74) *Attorney, Agent, or Firm* — Birch, Stewart, Kolasch & Birch, LLP

(57) ABSTRACT

A hearing aid with an earpiece for placement in the ear canal, and a dome, are disclosed. The earpiece comprises a speaker unit comprising: a receiver extending along an axis between an outlet surface perpendicular to the axis and a bottom surface perpendicular to the axis, a receiver outlet directed towards the ear canal of the user when the earpiece is mounted in the ear canal, a microphone having an inlet surface and a bottom surface, wherein the microphone is placed in connection with the receiver, a microphone inlet directed towards the ear canal of the user when the earpiece is mounted in the ear canal, wherein the receiver outlet is placed side by side with the microphone inlet, and wherein the microphone inlet and receiver outlet are separated by a wall, the earpiece further comprising a dome for placement on the speaker unit, the dome comprising: a speaker unit interface connecting a tip of the speaker unit to the dome such that when connected, the microphone inlet and receiver outlet are separated all the way into the ear canal, and an outer dome portion, wherein the dome comprises a two-component material in which the interface comprises a harder material, and the outer dome portion comprises a softer material.

19 Claims, 4 Drawing Sheets

(56) References Cited

U.S. PATENT DOCUMENTS

| | | | | |
|---|---|---|---|---|
| 2018/0109862 | A1* | 4/2018 | Lawand | H04R 25/656 |
| 2018/0109882 | A1 | 4/2018 | Lawand et al. | |
| 2019/0215621 | A1 | 7/2019 | Albahri et al. | |

* cited by examiner

HEARING AID WITH SPEAKER UNIT AND DOME

SUMMARY

For an inward facing microphone to work in a hearing aid, separation between the loudspeaker (termed 'speaker' in the following) and microphones audio paths must be achieved. This can result in the following problems:

- Interfacing both a speaker channel and microphone channel, can make it difficult to make an orientation independent solution. It can be difficult for the user to know how to orient the dome correctly.
- Implementing both a microphone and speaker channel in the speaker to dome interface can make the total size of the ear-piece big and make it difficult to fit into smaller ear canals.
- In many conventional speaker unit/dome/earpiece solutions the user would have to both change the dome/earpiece and also a separate wax filter in the speaker outlet of the speaker unit. This can be difficult for users with reduced dexterity and vision.
- The acoustical signal from the speaker and the acoustical input to the microphone needs to be separated all the way into the ear canal in order for the microphone to measure the SPL in the ear canal and not the receiver outlet channel.
- The connecting interface between the dome/earpiece and the speaker unit can be difficult to design to have both good retention, being small and being easy for the user to know if it is mounted correctly.

Thus, there is room for improvement in this area.

A Hearing Aid:

In an aspect of the present application, a hearing aid with an earpiece for placement in the ear canal is provided. The earpiece comprises a speaker unit comprising:

- a receiver extending along an axis between an outlet surface perpendicular to the axis and a bottom surface perpendicular to the axis,
- a receiver outlet directed towards the ear canal of the user, when the earpiece is mounted in the ear canal,
- a microphone having an inlet surface and a bottom surface, wherein the microphone is placed in connection with the receiver,
- a microphone inlet directed towards the ear canal of the user, when the earpiece is mounted in the ear canal, wherein the receiver outlet is placed side by side with the microphone inlet, and wherein the microphone inlet and receiver outlet are separated by a wall, the earpiece further comprising

- a dome for placement on the speaker unit, the dome comprising:
  - a speaker unit interface connecting a tip of the speaker unit to the dome such that when connected, the microphone inlet and receiver outlet are separated all the way into the ear canal, and
  - an outer dome portion, wherein the dome comprises a two-component material in which the speaker unit interface comprises a harder material, and the outer dome portion comprises a softer material.

The outlet surface and the bottom surface defining the receiver may be surfaces of the receiver, e.g. of a housing of the receiver.

The inlet surface and the bottom surface of the microphone may be opposing surfaces.

The term 'separated all the way into the ear canal' is intended to mean 'separated all the way into the actual residual cavity of the ear canal', meaning that the sound travelling through the outlet/inlet channels are separated all the way out of the dome, past the outlet and inlet parts of the hearing aid.

The dome may e.g. be manufactured by 2 k moulding. The dome may comprise two different materials. The dome may be moulded using the two-component material to provide that the speaker unit interface comprises a (relatively) harder material, and the outer dome portion comprises a (relatively) softer material. The harder material may have a Vickers hardness that is larger than the softer material, e.g. twice as large, such as five times as hard, such as ten times as hard. The softer material may be more flexible than the harder material (to thereby make the outer dome portion suitable for adapting to the form of the user's ear canal.

One advantage of a speaker unit with the receiver outlet and microphone inlet placed side by side separated by a wall, is that the earpiece becomes orientation independent. This allows the user to insert the hearing aid without having to struggle with orienting it in a certain way. This is advantageous for all users, but especially for those with reduced dexterity and/or vision. An advantage of the microphone inlet and receiver outlet being separated all the way into the ear canal, is that the sound pressure level (SPL) can be correctly measured by the microphone in the ear canal without being interfered by sound from the receiver outlet. An advantage of having a two-component dome with a harder portion and a softer portion, is that the harder interface portion becomes easier to snap on the speaker unit when the user is mounting it. This also makes it easier for the user to ensure that the dome is correctly mounted.

In another aspect of the present application, a hearing aid is provided, wherein the speaker unit interface further comprises a (e.g. fine) meshed wax filter integrated in the harder material.

In another aspect of the present application, a hearing aid is provided, wherein the dome further comprises a wax umbrella placed on top of the speaker unit interface.

An advantage of having a wax umbrella on top of the speaker unit interface, is that it provides an extra wax protection on top of the fine meshed wax filter that is already present in the speaker unit interface. The umbrella works as a first defence against wax or other debris that inevitably will affect the performance of the hearing aid. An advantage of having the built-in fine meshed wax filter in the interface (and in some embodiments the wax umbrella as well) is that the user won't have to change both the dome and a filter separately. Changing a small separate filter can be tedious and especially hard for people with decreased vision and/or dexterity.

In another aspect of the present application, a hearing aid is provided wherein the tip of the speaker unit and the speaker unit interface have a rounded shape to be more comfortable in the ear canal of the user.

An advantage of the speaker unit and speaker unit interface being rounded and thereby avoiding sharp edges is that the hearing aid becomes more comfortable for the user.

In another aspect of the present application, a hearing aid is provided wherein the microphone is placed at one side of the receiver such that the microphone inlet surface is closer to the receiver than the microphone bottom surface. Since MEMS microphones usually have a bigger surface area at the inlet surface compared to the bottom surface, this will allow for a smaller more rounded speaker unit. This will however require space for a microphone inlet channel between the receiver and microphone.

In another aspect of the present application, a hearing aid is provided wherein the microphone is placed at one side of the receiver such that the microphone bottom surface is closer to the receiver than the microphone inlet surface.

An advantage of placing the microphone like this is that the speaker unit becomes overall slimmer since the microphone can be placed up against the receiver.

In another aspect of the present application, a hearing aid is provided, wherein the microphone is placed at the bottom surface of the receiver.

An advantage of placing the microphone at the bottom of the receiver is that the speaker unit becomes even slimmer The microphone inlet surface may be closer to the receiver than the microphone bottom surface.

In another aspect of the present application, a hearing aid is provided wherein the microphone is placed at the outlet surface of the receiver.

An advantage of placing the microphone at the outlet surface of the receiver is that the speaker unit becomes very slim and the microphone inlet becomes as short as possible. A short inlet will keep microphone inlet resonances high in frequency, and be less disturbing in the frequency area below 8 kHz.

In another aspect of the present application, a hearing aid is provided, wherein the tip of the speaker unit has an indentation for enabling a snap-on connection between the dome and the speaker unit. The speaker unit interface of the dome and the receiver unit may be configured to provide a snap-on connection between the dome and the receiver unit.

An advantage of having a snap-on connection between the dome and speaker unit is that it provides a tactile click which improves the user experience. Another advantage is that it provides an acoustical seal. Another advantage is that it is possible to make the interface smaller than with conventional interfaces with a softer material.

The speaker unit interface of the dome may be configured to provide that the microphone inlet is arranged around the receiver outlet. The microphone inlet may be concentrically arranged around the receiver outlet. The speaker unit may be configured to receive the speaker unit interface of the dome to ensure a snap-on connection. The speaker unit may be configured to receive the speaker unit interface of the dome to ensure that the microphone inlet and the receiver outlet are separated all the way (in the dome) into the ear canal. The speaker unit interface of the dome may comprise a wax filter.

The outer dome portion may comprise a wax umbrella covering the speaker outlet and the microphone inlet of the dome, and wherein the dome is configured to allow sound to enter the microphone inlet and escape from the receiver outlet, while separating inlet sound from outlet sound. The wax umbrella may have an essentially circular cross section in a plane perpendicular to the axis of the (elongate) receiver. The wax umbrella may be mechanically separated from the rest of the dome (e.g. connected to the speaker unit interface or to the outer dome portion) by a separation wall (separating the microphone inlet and the receiver outlet of the dome). The separation wall may comprise a single wall essentially extending over a diameter of the wax umbrella. The separation wall may comprise be configured to split the space between the upper part of the wax umbrella and the rest of dome into a multitude of angular spaces (e.g. in a cucumber pattern, see FIG. 5C). The separation wall has the advantage of (to a certain extent) separating the sound to the microphone from the sound provided by the receiver.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. The hearing aid may comprise demodulation circuitry for demodulating the received direct electric input to provide the direct electric input signal representing an audio signal and/or a control signal e.g. for setting an operational parameter (e.g. volume) and/or a processing parameter of the hearing aid. In general, a wireless link established by antenna and transceiver circuitry of the hearing aid can be of any type. The wireless link may be established between two devices, e.g. between an entertainment device (e.g. a TV) and the hearing aid, or between two hearing aids, e.g. via a third, intermediate device (e.g. a processing device, such as a remote control device, a smartphone, etc.). The wireless link may be used under power constraints, e.g. in that the hearing aid may be constituted by or comprise a portable (typically battery driven) device. The wireless link may be a link based on near-field communication, e.g. an inductive link based on an inductive coupling between antenna coils of transmitter and receiver parts. The wireless link may be based on far-field, electromagnetic radiation. The communication via the wireless link may be arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The communication between the hearing aid and the other device may be in the base band (audio frequency range, e.g. between 0 and 20 kHz). Preferably, communication between the hearing aid and the other device is based on some sort of modulation at frequencies above 100 kHz. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing aid and/or the communication device may comprise an electrically small antenna. An 'electrically small antenna' is in the present context taken to mean that the spatial extension of the antenna (e.g. the maximum physical dimension in any direction) is much smaller than the wavelength $\lambda_{Tx}$ of the transmitted electric signal. The spatial extension of the antenna may be a factor of 10, or 50 or 100 or more, or a factor of 1000 or more, smaller than the carrier wavelength $\lambda_{Tx}$ of the transmitted signal. The hearing aid may be a relatively small device. The term 'a relatively small device' is in the present context taken to mean a device whose maximum physical dimension (and thus of an antenna for providing a wireless interface to the device) is smaller than 10 cm, such as smaller than 5 cm. In the present context, 'a relatively small device' may be a device whose maximum physical dimension is much smaller (e.g. more than 3 times, such as more than 10 times smaller, such as more than 20 times small) than the operating wavelength of a wireless interface to which the antenna is intended (ideally an antenna for radiation of electromagnetic waves at a given frequency should be larger than or equal to half the wavelength of the radiated waves at that frequency). At 860 MHz, the wavelength in vacuum is around 35 cm. At 2.4 GHz, the wavelength in vacuum is around 12 cm. The hearing aid may have a maximum outer dimension of the order of 0.15 m (e.g. a handheld mobile telephone). The hearing aid may have a maximum outer dimension of the order of 0.08 m (e.g. a headset). The hearing aid may have a maximum outer dimension of the order of 0.04 m (e.g. a hearing instrument).

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g.

The hearing aid may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain)

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classification unit may be based on or comprise a neural network, e.g. a rained neural network.

The hearing aid may comprise an acoustic (and/or mechanical) feedback control (e.g. suppression) or echo-cancelling system. Acoustic feedback occurs because the output loudspeaker signal from an audio system providing amplification of a signal picked up by a microphone is partly returned to the microphone via an acoustic coupling through the air or other media. The part of the loudspeaker signal returned to the microphone is then re-amplified by the system before it is re-presented at the loudspeaker, and again returned to the microphone. As this cycle continues, the effect of acoustic feedback becomes audible as artifacts or even worse, howling, when the system becomes unstable. The problem appears typically when the microphone and the loudspeaker are placed closely together, as e.g. in hearing aids or other audio systems. Some other classic situations with feedback problems are telephony, public address systems, headsets, audio conference systems, etc. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The feedback control system may comprise a feedback estimation unit for providing a feedback signal representative of an estimate of the acoustic feedback path, and a combination unit, e.g. a subtraction unit, for subtracting the feedback signal from a signal of the forward path (e.g. as picked up by an input transducer of the hearing aid). The feedback estimation unit may comprise an update part comprising an adaptive algorithm and a variable filter part for filtering an input signal according to variable filter coefficients determined by said adaptive algorithm, wherein the update part is configured to update said filter coefficients of the variable filter part with a configurable update frequency $f_{upd}$. The hearing aid may be configured to provide that the configurable update frequency $f_{upd}$ has a maximum value $f_{upd,max}$. The maximum value $f_{upd,max}$ x may be a fraction of a sampling frequency $f_s$ of an AD converter of the hearing aid ($f_{upd,max}=f_s/D$).

The update part of the adaptive filter may comprise an adaptive algorithm for calculating updated filter coefficients for being transferred to the variable filter part of the adaptive filter. The timing of calculation and/or transfer of updated filter coefficients from the update part to the variable filter part may be controlled by the activation control unit. The timing of the update (e.g. its specific point in time, and/or its update frequency) may preferably be influenced by various properties of the signal of the forward path. The update control scheme is preferably supported by one or more detectors of the hearing aid, preferably included in a predefined criterion comprising the detector signals.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

A Dome for a Hearing Aid:

In another aspect of the present invention there is provided a dome for a hearing aid. The dome may be adapted for placement on a speaker unit. The dome comprises a speaker unit interface for connecting a tip of the speaker unit to the dome such that when connected, a microphone inlet and receiver outlet are separated all the way into the ear canal. The dome may further comprise an outer dome portion, wherein the dome comprises a two-component material in which the interface comprises a harder material, and the outer dome portion comprises a softer material.

Definitions:

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output unit may comprise an output transducer, such as e.g. a loudspeaker for providing an air-borne acoustic signal or a vibrator for providing a structure-borne or liquid-borne acoustic signal. In some hearing aids, the output unit may comprise one or more output electrodes for providing electric signals (e.g. to a multi-electrode array) for electrically stimulating the cochlear nerve (cochlear implant type hearing aid).

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids. More specifically, it relates to earpieces for receiver-in-the-ear (RITE) hearing styles.

Figure 1A:
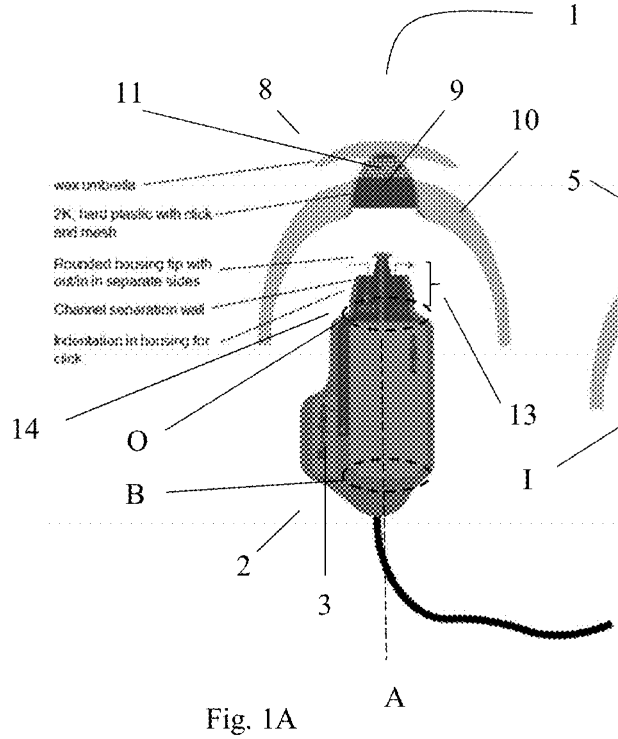
FIG. 1A shows an earpiece according to an aspect of the application.
Figure 1B:
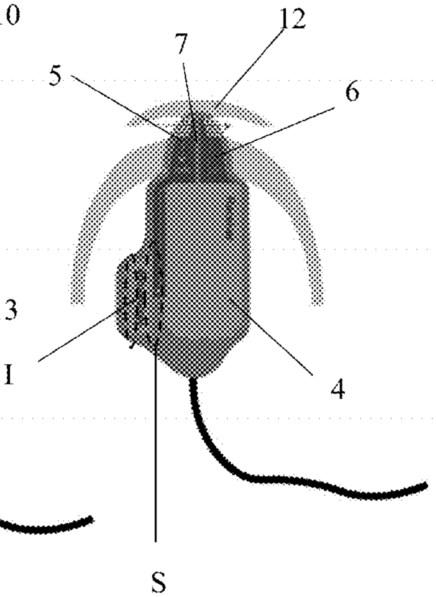
FIG. 1B shows an earpiece according to an aspect of the application.

FIGS. 1A and 1B show an earpiece 1 according to an aspect of the application. The earpiece, when used, is placed in the ear canal of the user. The earpiece may be connected to a behind the ear portion of the hearing aid (not shown). The earpiece 1 comprises two main portions; a speaker unit 2 and a dome 8. The dome 8 is to be mounted on the speaker unit 2. FIG. 1A shows the un-mounted earpiece. FIG. 1B shows the earpiece 1 when the dome 8 is mounted on the speaker unit 2. The speaker unit 2 comprises a receiver 4. The receiver (speaker) 4 extends along an axis A. The receiver has an outlet surface O and a bottom surface B, and the axis A extends between the outlet surface O and the bottom surface B. The speaker unit 4 has a receiver outlet 6. The receiver outlet 6 is placed such that when the earpiece is mounted in the ear canal, the receiver outlet 6 is directed towards the ear canal, thereby acting as a sound channel to the user. A microphone 3 is placed in connection with the receiver 4. The microphone 3 has an inlet surface I (which comprises the sound inlet of the microphone) and a bottom surface S. Preferably, the microphone 3 is a MEMS microphone. In FIGS. 1A and 1B, the microphone 3 is placed on one side of the receiver 4, with the microphone inlet surface I facing the receiver 4. Other placements of the microphone 3 is equally plausible, as will be apparent in the following figures. The speaker unit 2 further comprises a microphone inlet 5 in connection with the microphone 3 through which sound is picked up. When the earpiece is mounted in the ear, the microphone inlet 5 is directed towards the ear canal. It is to be noted, that the microphone inlet 5 and the receiver outlet 6 are essentially two channels or canals. These channels 5 and 6 are directed towards the ear canal when the hearing aid is mounted in the ear canal. The phrase 'towards the ear canal' should be interpreted as 'essentially pointing into the ear canal and towards the tympanic membrane'. The receiver outlet 6 and the microphone inlet 5 are placed side by side, as seen in FIGS. 1A and 1B. The outlet 6 and inlet 5 are however separated by a wall 7. The wall 7 comprises a material such as a polymer based material, or any other suitable material. The earpiece 1 further comprises a dome 8. The dome 8 is to be mounted on top of the speaker unit 2 when in use. When mounted, as in FIG. 1B, the microphone inlet 5 and receiver outlet 6 are separated all the way into the ear canal. The dome 8 comprises a speaker unit interface 9. The interface 9 comprises a hard material, such as a polymer based material, or any other suitable material. The dome 8 further comprises an outer dome portion 10. The outer dome portion 10 of the dome 8, comprises a softer material (i.e. softer than the interface 9) such as a polymer material, or any other suitable material. Thus, the dome 8 comprises a two-component (2K) material which allows for a sufficient snap-on connection between the dome 8 and the speaker unit 2. When the user is mounting (i.e. connecting) the dome 8 and the speaker unit 2, the harder material of the interface 9 allows for a "clicking" sensation. This alleviates the user of wondering if the earpiece is correctly, and safely, mounted. The snap-on connection is further ensured by indentations 14 in the tip 13, as seen in FIGS. 1A and 1B. The indentation in theses figs. is represented by a slight indentation in the 'neck' of the tip 13. However, other indentations are also plausible, such as various shaped recesses for example at the uppermost part of the tip 13. The snap-on feature is further described with reference to FIG. 6. The earpiece 1 can further comprise a fine meshed wax filter 11 for protecting against wax and other debris. The filter 11 is integrated in the interface 9. The dome 8 can also further comprise a wax umbrella 12 placed on top of the interface 9. The wax umbrella 12 provides a first shield against wax and other debris, and can be replaced without having to replace the entire dome 8. The wax umbrella 12 illustrated in this application has a symmetrical smooth shape, but other shapes and profiles are plausible, such as a wave edge profile. In a 2K dome as described above, the wax umbrella comprises the softer material. The tip 13 of the speaker unit 2 and the interface 9, as can be seen in FIGS. 1A and 1B, can preferably have a rounded shape. By having a rounded shape and avoiding sharp edges, the earpiece is more comfortable for the user. As can be seen in FIGS. 1A and 1B, the microphone 3 is placed such that the microphone inlet surface I is facing towards the receiver 4, i.e. the inlet surface I is closer to the receiver 4 than what the microphone bottom surface S is. As will become apparent from the following figures, the microphone can also be placed reversed, i.e. such that the bottom surface S is facing the receiver 4. Where the tip 13 of the speaker unit 2 meets the interface 9 of the dome 8, extra sealing in the form of a silicone layer can be provided to ensure no leakage occurs between the two channels 5 and 6. In FIGS. 1A and 1B, the microphone inlet 5 an receiver outlet 6 are illustrated as having the same size, however it is possible that the two channels are asymmetric in size to prioritize the capacities of the channels or to accommodate for a specific number of apertures (holes) in the filter 11 of the dome 8.

Figure 2:
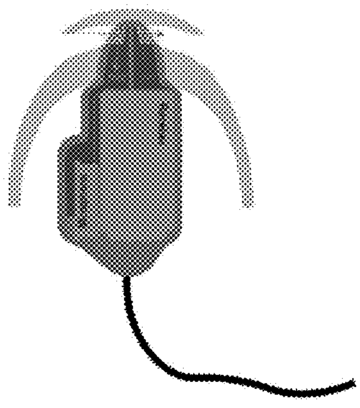
FIG. 2 shows an earpiece according to an aspect of the application.
Figure 3:
FIG. 3 shows an earpiece according to an aspect of the application.
Figure 4:
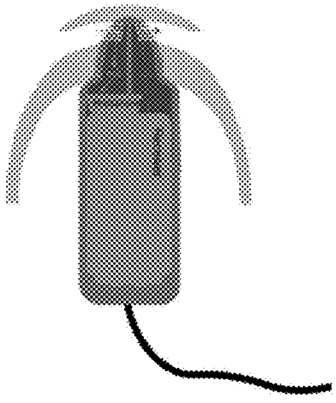
FIG. 4 shows an earpiece according to an aspect of the application.

FIGS. 2, 3 and 4 show a mounted earpiece which is similar to the one in FIG. 1B. In FIG. 2, the microphone 3 is placed on the side of the receiver 4 (similarly to FIGS. 1A and 1B), however, the microphone is now placed such that the microphone inlet I faces away from the receiver 4 and the axis A. Thus, in FIG. 2, the microphone bottom surface S is closer to the receiver 4 than what the inlet surface I is. This could provide for a slightly slimmer earpiece 1. In FIG. 3, the microphone 3 is now placed at the bottom surface B of the receiver 4. In FIG. 3 the microphone inlet surface I is facing the receiver 4, but it could equally be placed such that the microphone bottom S was facing the receiver 4. By placing the microphone 3 at the bottom of the receiver, a slimmer but longer earpiece is achieved. FIG. 4 shows the microphone 3 being placed at the outlet surface O of the receiver 4. In FIG. 4 the microphone inlet surface I is facing away from the receiver 4, but it could equally be placed facing towards the receiver 4. This placement of the microphone 3 allows for the shortest microphone inlet path. This could be advantageous because it avoids resonance and increased moving mass that could potentially interfere with the microphone response. This will also keep the microphone inlet resonance at higher frequencies>8 kHz.

Figure 5A:
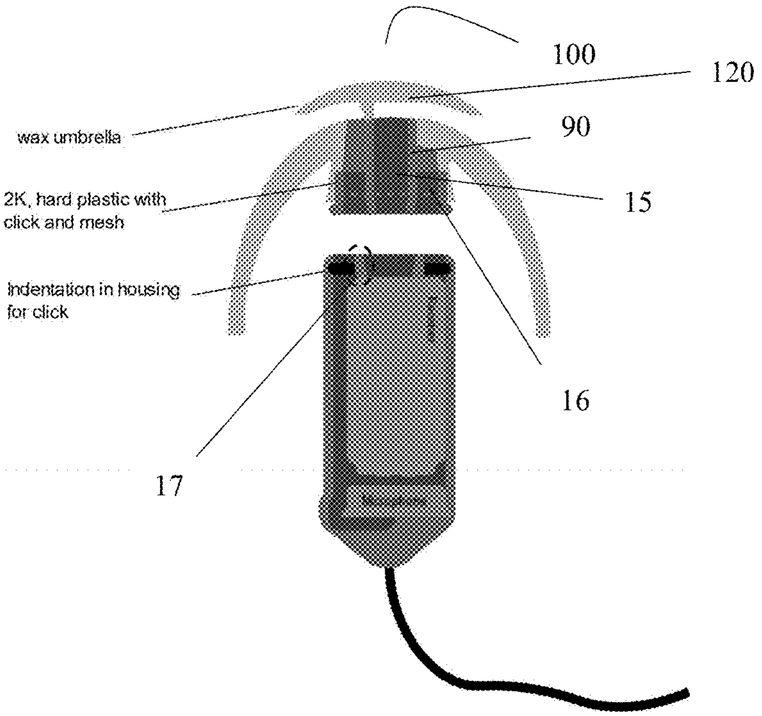
FIG. 5A shows an earpiece aid according to an aspect of the application.
Figure 5B:
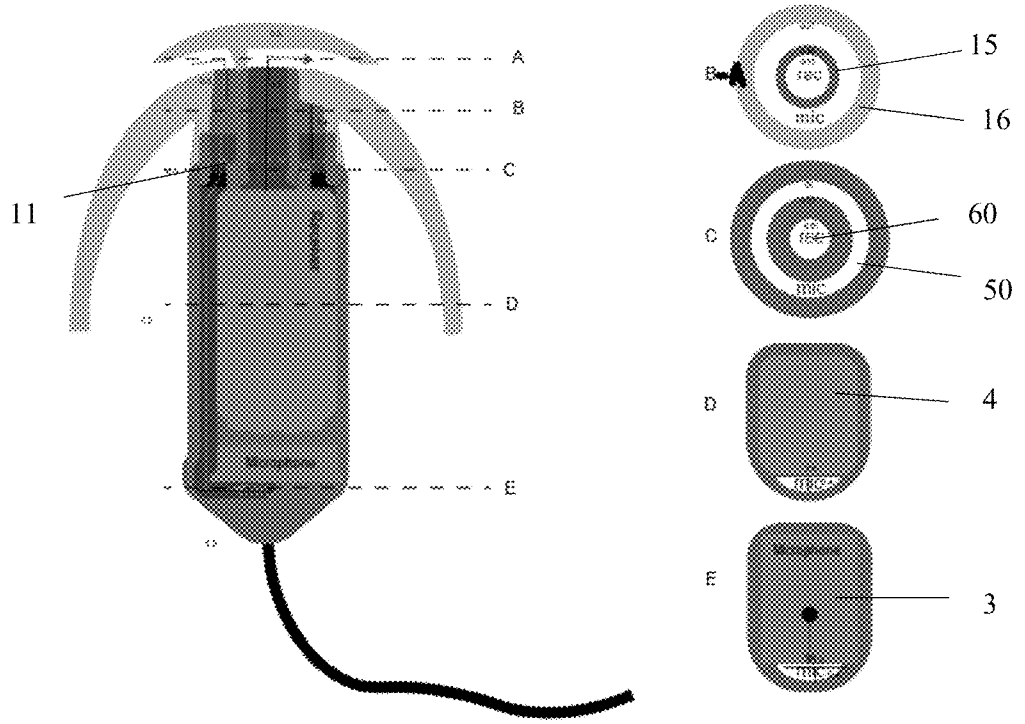
FIG. 5B shows an earpiece and its cross sections according to an aspect of the application.

FIG. 5A shows a cross-section of an earpiece 100 according to another aspect of the application. The earpiece 100 is similar to the ones shown in respect to FIGS. 1-4 but shows another option for the dome 8. The interface between the dome 8 and the speaker unit 2 is also different from the embodiment in FIGS. 1-4. In FIG. 5A, the microphone 3 is placed at the bottom of the receiver 4. It is to be noted, that the microphone 3 could be placed anywhere in the speaker unit 2, for example on the sides or at the top, as in FIGS. 1-4. A cross-section of the interface 90 can be seen in FIG. 5B. The interface 90 in FIGS. 5A and 5B has a middle section 15 forming a receiver outlet 60, and another outer section 16. The space between the sections 15 and 16 forms a microphone inlet 50. The outlet 60 and inlet 50 are separated by the middle section 15 which acts a wall, similar to the wall in FIGS. 1-4. The outlet 15 has a slightly bent profile that corresponds to a structure 17 in the speaker unit 2. This allows for a "clicking" snap-on mounting between the dome 8 and the speaker unit 2. The structure 17 in the speaker unit portion of the earpiece is angled to match the interface 90 and enable the snap-on. The earpiece 100 in FIGS. 5A and 5B is shown with a wax umbrella 120 attached to the dome 8. The wax umbrella 120 is attached to the interface 90 so as to allow sound from the receiver outlet 60 to be guided into the ear canal.

FIG. 5B shows cross-sections of the earpiece 100 in FIG. 5A as seen from above. Here, the receiver outlet 60 and microphone inlet 50 are clearly shown. A cross-section of the receiver 4 and microphone 3 can also be seen. It is important to note that the particular shape of the cross-sections could be varied and are not limited to the ones shown in FIG. 5B. The speaker unit interface 9 in FIGS. 5A and B also has a wax filter 11 integrated in the interface 9.

Figure 5C:
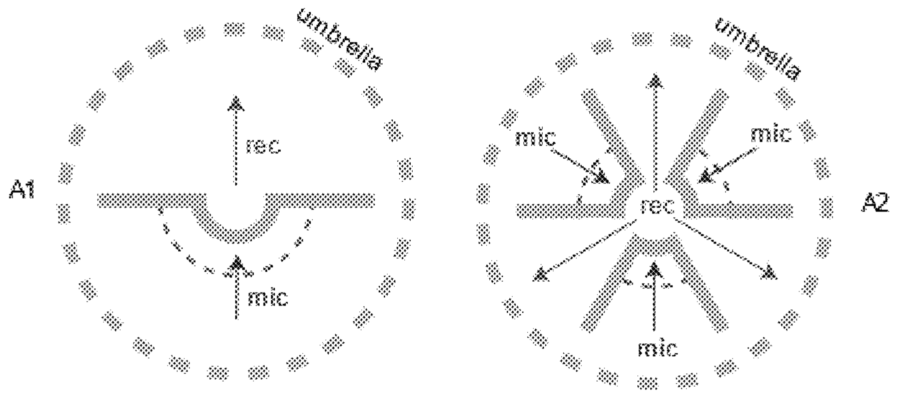
FIG. 5C shows different cross sections according to an aspect of the application.

FIG. 5C shows two potential versions of cross-sections (referred to as 'A' in FIG. 5B) of the earpiece 100. These two cross-sections show two alternative ways of splitting the receiver outlet and microphone inlet.

Figure 6:
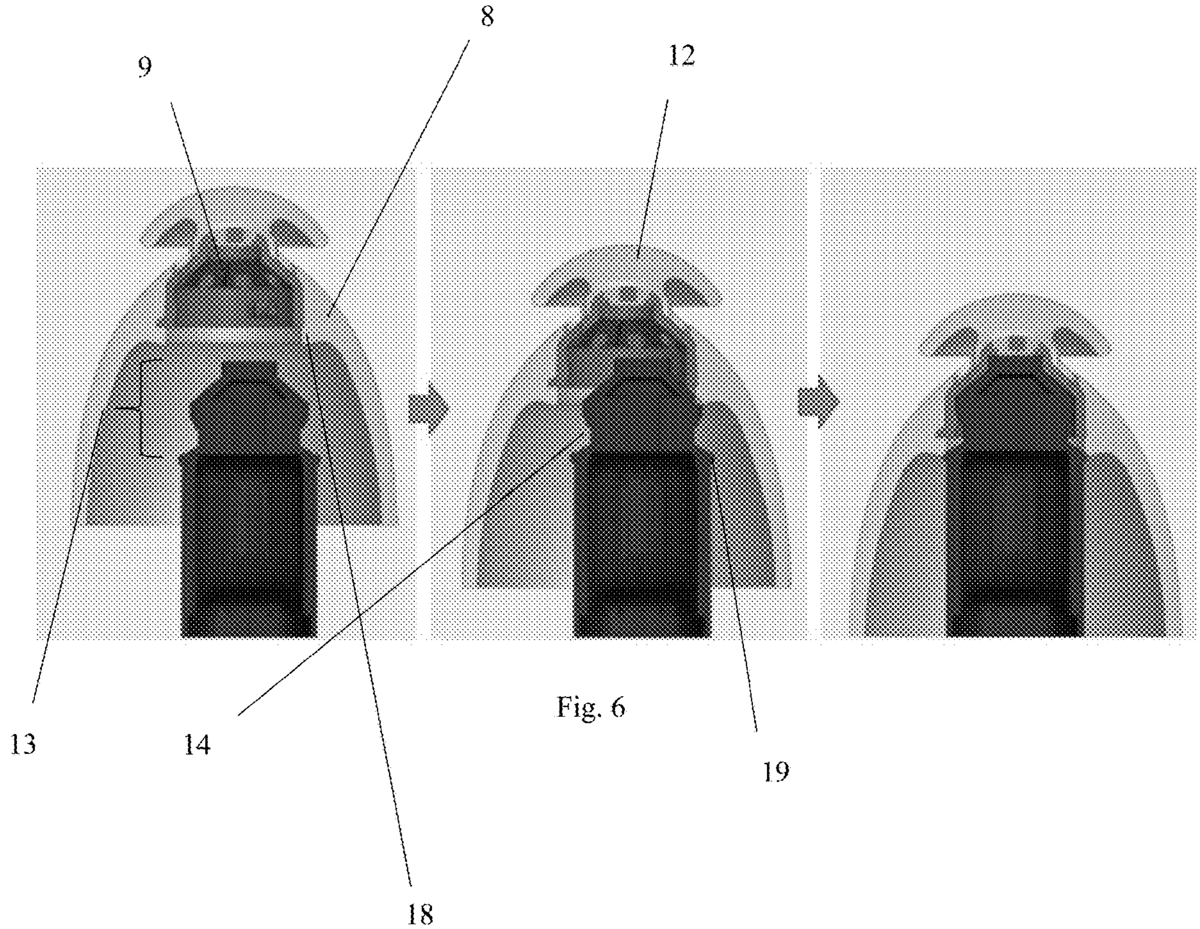
FIG. 6 shows a snap-on feature according to an aspect of the application.

FIG. 6 shows a snap-on feature according to the aspect as described in FIGS. 1-4. In the figure, a cross-section of a dome 8 can be seen mounted onto the speaker unit 2 by "clicking" the speaker unit interface 9 onto the tip portion 13 of the speaker unit 2. The tip portion 13 has a slanted profile to enable a good aligning. The tip 13 further comprises indentations 14 to enable the "snap-on". In the left portion of the figure, the dome 8 can be seen radially misaligned relative to the tip 13 of the speaker unit 2. In the middle portion of the figure, the dome 8 is guided along the tapered surface of the tip 13. In the right portion, the dome 8 is correctly aligned onto the speaker unit 2. The use of a 2K dome, i.e. a dome 2 comprising two materials with different properties (i.e. a speaker unit interface 9 with a harder material relative to the outer portion 10) enables the snap-on, i.e. a tactile click. This tactile click signals to the user that the dome 8 is correctly mounted. The removal of the dome 8 can be done by either wedging a thin instrument between the interface 9 and the indentations 14, or by pinching the dome 8 between two fingers and pulling. FIG. 6 further shows a sealing lip 18. The sealing lip 18 can be a part of the dome 8 and ensures acoustic sealing in all 360 degrees. The sealing lip 18 blocks sound leaking from the two channels 5 and 6. To further ensure acoustic sealing in 360 degrees, an added layer of silicone can be added on the circumference around the lower part of the tip 13. This added silicone layer interferes with the sealing lip 18 and provides a "tight" seal. The cross section of this silicone layer 19 is illustrated in FIG. 6 as a small "dot". The dome 8 shown in FIG. 6 is illustrated with a wax umbrella 12, but as previously stated, the umbrella 12 is optional.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The invention claimed is:

1. A hearing aid with an earpiece for placement in the ear canal, the earpiece comprising:

a speaker unit comprising:

a receiver extending along an axis between an outlet surface perpendicular to the axis and a bottom surface perpendicular to the axis, a receiver outlet directed towards the ear canal of the user when the earpiece is mounted in the ear canal, a microphone having an inlet surface and a bottom surface, wherein the microphone is placed in connection with the receiver, a microphone inlet directed towards the ear canal of the user when the earpiece is mounted in the ear canal, wherein the receiver outlet is placed side by side with the microphone inlet, and wherein the microphone inlet and receiver outlet are separated by a wall, the earpiece further comprising:

a dome for placement on the speaker unit, the dome comprising:

a speaker unit interface connecting a tip of the speaker unit to the dome such that when connected, the microphone inlet and receiver outlet are separated all the way into the ear canal, and an outer dome portion, wherein the dome comprises a two-component material in which the interface comprises a harder material, and the outer dome portion comprises a softer material.

2. A hearing aid according to claim 1, wherein the speaker unit interface further comprises a fine meshed wax filter integrated in the harder material.

3. A hearing aid according to claim 1, wherein the dome further comprises a wax umbrella placed on top of the speaker unit interface.

4. A hearing aid according to claim 1, wherein the tip of the speaker unit and the speaker unit interface have a rounded shape to be more comfortable in the ear canal of the user.

5. A hearing aid according to claim 1, wherein the microphone is placed at one side of the receiver such that the microphone inlet surface is closer to the receiver than what the microphone bottom surface is.

6. A hearing aid according to claim 1, wherein the microphone is placed at one side of the receiver such that the microphone bottom surface is closer to the receiver than what the microphone inlet surface is.

7. A hearing aid according to claim 1, wherein the microphone is placed at the bottom surface of the receiver.

8. A hearing aid according to claim 1, wherein the microphone is placed at the outlet surface of the receiver.

9. A hearing aid according to claim 1, wherein the tip of the speaker unit has an indentation for enabling a snap-on connection between the dome and the speaker unit.

10. A hearing aid according to claim 1, wherein the speaker unit interface of the dome and the receiver unit are configured to provide a snap-on connection between the dome and the receiver unit that ensures separation of the receiver outlet and the microphone inlet.

11. A hearing aid according to claim 1, wherein the speaker unit interface of the dome is configured to provide that the microphone inlet is arranged around the receiver outlet.

12. A hearing aid according to claim 10 wherein the outer dome portion comprises a wax umbrella covering the speaker outlet and the microphone inlet of the dome, and wherein the dome is configured to allow sound to enter the microphone inlet and escape from the receiver outlet, while separating inlet sound from outlet sound.

13. A hearing aid according to claim 2, wherein the tip of the speaker unit and the speaker unit interface have a rounded shape to be more comfortable in the ear canal of the user.

14. A hearing aid according to claim 3, wherein the tip of the speaker unit and the speaker unit interface have a rounded shape to be more comfortable in the ear canal of the user.

15. A hearing aid according to claim 2, wherein the microphone is placed at one side of the receiver such that the microphone inlet surface is closer to the receiver than what the microphone bottom surface is.

16. A hearing aid according to claim 3, wherein the microphone is placed at one side of the receiver such that the microphone inlet surface is closer to the receiver than what the microphone bottom surface is.

17. A hearing aid according to claim 4, wherein the microphone is placed at one side of the receiver such that the microphone inlet surface is closer to the receiver than what the microphone bottom surface is.

18. A hearing aid according to claim 2, wherein the microphone is placed at one side of the receiver such that the microphone bottom surface is closer to the receiver than what the microphone inlet surface is.

19. A hearing aid according to claim 3, wherein the microphone is placed at one side of the receiver such that the microphone bottom surface is closer to the receiver than what the microphone inlet surface is.

* * * * *